Jan. 22, 1957  M. J. STURTEVANT  2,778,695
SEALING STRUCTURE
Filed Oct. 9, 1952  2 Sheets-Sheet 1
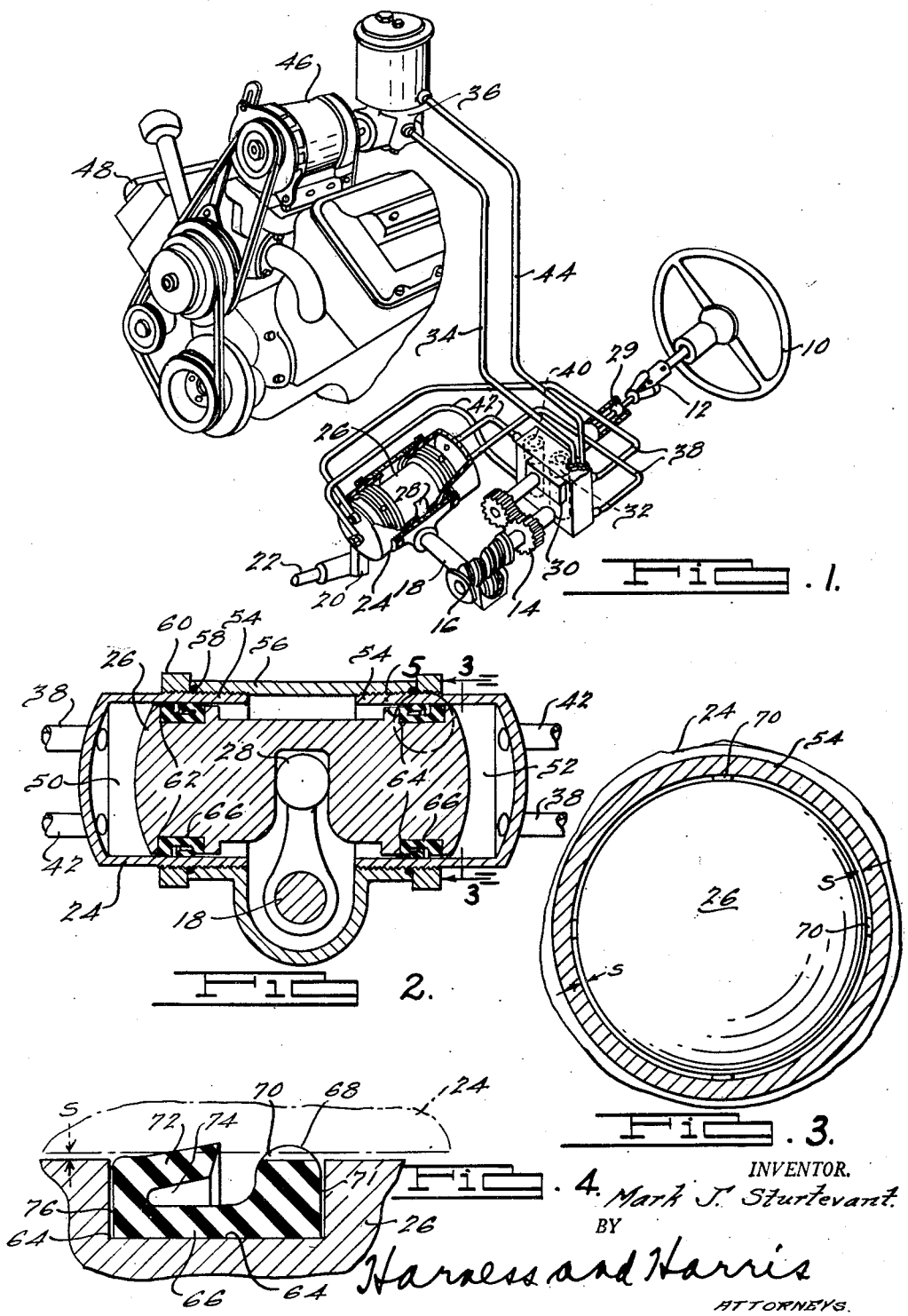
INVENTOR.
Mark J. Sturtevant
BY
Harness and Harris
ATTORNEYS.

Jan. 22, 1957  M. J. STURTEVANT  2,778,695
SEALING STRUCTURE

Filed Oct. 9, 1952  2 Sheets-Sheet 2

INVENTOR.
Mark J. Sturtevant
BY
Harness and Harris
ATTORNEYS.

United States Patent Office 2,778,695
Patented Jan. 22, 1957

2,778,695
SEALING STRUCTURE

Mark J. Sturtevant, St. Clair Shores, Mich., assignor to Chrysler Corporation, Highland Park, Mich., a corporation of Delaware Application October 9, 1952, Serial No. 313,938

7 Claims. (Cl. 308—3.5)

This application relates to a sealing structure, especially for sealing the circumferential clearance defined in the radially short space between a piston and a cylinder, between a piston rod or a shaft and a housing through which it passes, between a movable cylinder and a stationary ram therewithin, or between any other interfitting circular parts of like construction, particularly in which relative motion of reciprocation and/or rotation is involved.

An object of the invention is the provision of a part-engaging, sealing structure having relatively low friction between itself and the part that it sealingly engages while at the same time giving very low leakage.

Another object is the provision of a single sealing structure which is self-centering.

Another object is the provision of lip-type sealing structure which will give a long wearing life and resist the formation of any scuffing action adjacent the seal lip.

A further object of the invention is to provide a one-piece sealing structure of relatively low cost and of such one-piece construction as to be easily installed in an assembly to be sealed.

An additional object is the provision, between two interfitting circular parts, of a non-extrusion sealing member which provides a seal but at the same time prevents locking or wedging between the two thus interfitting parts.

Another object is to provide a unitary seal of deformable material having two independent sealing and centering portions, the first to provide a folded type positive lip seal, and the second to center the seal and prevent scuff and wear from manifesting itself at the normally expected location of the outside of the fold providing the lip.

A further object of the invention is the provision of a supporting-member-supported seal formed of a one-piece elongated deformable member from which the fluid pressure sealing stresses are communicated directly to the supporting member from point of origination without passing through an extended length of or through substantial intervening portions in the elongated deformable member. According to an additional feature of at least one modification herein of such a one-piece seal as the foregoing, two-way sealing action is provided by means of a seal portion formed at each end of the deformable member, each acting mutually exclusively of the other and being centered by means of a common intervening centering portion.

Further features, objects and advantages will either be specifically pointed out or become apparent when for a better understanding of the invention, reference is made to the following written description taken in conjunction with the accompanying drawings in which:

Figure 1 is a perspective showing of an hydraulic steering apparatus illustrative of but one environment in which the present sealing structure finds application;

Figure 2 is a section of the hydraulic piston-to-cylinder seal components in the apparatus of Figure 1;

Figure 3 is a transverse section of the sealed parts along lines 3—3 of Figure 2;

Figure 4 is an enlarged fragmentary showing of the actual seal structure in relaxed state;

Figure 5:
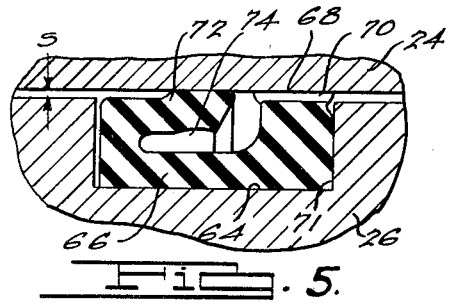
Figures 5 and 6 are sequential sectional figures of the seal structure as installed, before and after application of fluid pressure.
Figure 6:
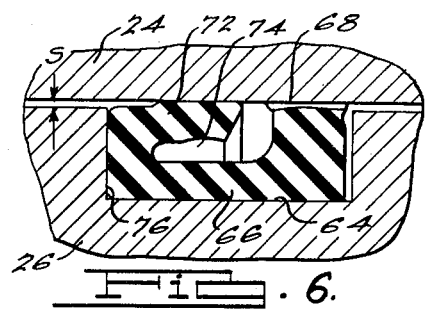

In Figure 1, illustrating one application of the present invention, a steering mechanism is shown which is of the hydraulic power boost type controlled by a manually actuated steering wheel 10. The wheel 10 is supported at the head of a steering mast or column, not shown, housing an inclined two-piece rotatable steering shaft 12 having the relatively upper piece thereof connected to the wheel 10, and the lower piece thereof connected to one of a pair of spur gears 14. The spur gears 14 are connected to transmit a purely mechanical drive effective at all times directly through a series-connected worm and roller 16, a rockshaft 18, and a pitman arm 20 leading to a steering linkage-connected drag link 22. Provision is made through a power boost effect to relieve the manual actuator of approximately 80% of the steering effort required to operate the drag link 22 and steering linkage, and results through provision of an hydraulic power cylinder and piston 24, 26, the latter of which is connected to a crank 28 splined to the rockshaft 18. Such steering mechanism is primarily intended for automotive use, preferably in passenger cars.

The lower piece of the inclined two-piece shaft 12 is journalled in a spherical bearing 29 and has an intermediate portion passing through a closely fitting bearing formed in a valve operating block 30 which is spring-suspended for a floating movement of translation within predetermined limits and thus permits the lower shaft piece and one of the pair of pinions 14 to have a limited tilting motion of oscillation about the spherical bearing 29 as a center. At one end thereof, the bearing-carrying block 30 is engaged by a pair of opposed distribution valves 32 which are under control of the block 30 and each of which distributes pressure fluid from a line 34 supplied by a fluid pressure source 36, to the respective inlet lines 38 leading to each end of the power cylinder 24. At its opposite end, the block 30 is engaged by a pair of opposed reaction valves 40 which are under control of the block 30 and each of which controls the back pressure of fluid in a set of respective outlet lines 42 leading from each end of the power cylinder 24 and connected through the reaction valves 40 to a return line 44 to the pressure source 36.

The pressure source 36 is coupled in tandem to a generator 46 which is belt driven by and mounted to an automotive engine 48 presently shown to be of an automotive V-8 type now in extensive commercial use. The fluid medium circulated by the pressure source 36 is preferably oil, glycerine or the like, and for a fuller understanding of the circulating effect and operation of the pressure source 36, and for an understanding of the structural details of the pairs of valves 32, 40, reference may be had to the illustrated booklet Power Steering for Chrysler and De Soto Cars, March 28, 1952, prepared and distributed by the Department of Technical Data and Information, Chrysler Corporation Engineering Division, Detroit 31, Michigan.

In Figure 2, the mutually paired ones of the inlet and outlet lines 38, 42 are connected at the opposite ends of the cylinder 24 to serve a pair of working chambers 50, 52 mutually formed by the power cylinder 24 and the piston 26. The power cylinder 24 is formed of a pair of drawn steel threaded cylinder parts 54 and an internally threaded stationary casing 56 into which the parts 54 are screwed. After the threaded parts 54, 56 are screwed together, the threads are sealed by means of a seal 58 which is held in place by a spanner nut locking ring 60. The piston 26 is of the full-floating type, that is to say, it is not directed in its movement by a piston rod or guide connected thereto and the piston 26 is so arranged as to be self-guiding within the cylinder 24. To this end, a pair of spaced-apart shallow grooves 62 is formed one at each end of the piston 26 and each receiving therein one of a pair of seals each having an elongated flat body 66. These seals are solid and slightly deformable and are preferably composed of rubber, neoprene, elastic plastic or resins, or other elastomeric material.

In Figures 3, 4, 5, and 6, the solid flat elongated body 66 of each seal will be noted to be thickened at one end portion thereof so as to provide a centering nose or bearing 68 having a generally semi-circular cross section. The elongated body 66 seats on the bottom of a wide but shallow groove, for instance, the groove 64. In the present illustrated showing, the radially short piston-to-cylinder clearance space indicated at S is preferably 0.010" at each side of the piston 26 thus giving the piston 26 a total diametrical clearance of 0.020". The thickened one end portion defining the centering nose 68 is formed with a side surface engageable with an end wall 71 of the groove 64. The seal body 66 is thickened at its opposite end and reversely bent on itself so as to be radially offset and to define a reentrant angled space 74 and a sealing lip 72. This latter noted opposite end of the body 66 has a side surface which is engageable with an end wall 76 of the groove 64. When either of the seal bodies 66 of Figure 4 is seated on the bottom of a groove 64, the interior surface of the associated cylinder member 24 presses against and deforms the centering nose 68 thereof so as to provide an area of sliding contact with the wall of the cylinder member 24 which is substantially axially coextensive with and substantially parallel to the area of contact between the thickened one end portion of the seal body 66 and the bottom of the groove 64. The pressure of contact is greatest substantially midway between the axial ends of the area of contact of the nose 68 with the interior wall of the cylinder 24. In absence of pressure fluid in the reentrant angled space 74, the side surface of the seal body 66 may or may not engage the end wall 71 of the groove 64. The centering nose 68 is annularly discontinuous in that one or more transverse notches or interruptions 70 of general semi-circular cross section, are formed therein to permit the free communication of pressure fluid between the sides of the nose 68 and into and out of the reentrant angled space 74. The seal lip 72, shown in relaxed condition in Figure 4, is arranged to be deflected slightly inwardly when the seal is assembled between the piston and the cylinder 24, 26 so as to provide a predetermined area of sealing contact with the cylinder 24, the lip 72 being slightly deformed as a result of the pressure of the cylinder wall 24 thereupon. Whenever fluid pressure is generated in the vicinity of the right hand end of the seal body 66 of Figure 6, it is freely communicated through the notches 70 and it enters the reentrant angled space 74 of Figure 6 so as further to deform the lip 72 and increase the area of sealing contact from the predetermined area of sealing contact between the seal and the wall of the cylinder member 24 according to Figure 5. In such event, the seal body 66 is shifted to the left in accordance with Figure 6 whereupon the side surface thereof engages the end wall 76 of the seal groove 64 within the radially short space S between the piston and the cylinder 26, 24. The force of the fluid pressure within the reentrant angled area 74 is communicated directly through the fold of the seal to the groove end wall 76 without passing through any intervening or extended portion of the deformable material composing the seal body 66, and under the influence of fluid pressure the piston 26 is caused to move axially with respect to the containing cylinder 24. The centering nose 68, which is pre-stressed regardless of whether any fluid pressure is in existence or not, constrains the motion of the piston 26 to movement in an axial direction without any appreciable transverse component thus preventing any wear or scuffing from taking place at the fold of the body 66 forming the lip 72 in the vicinity of the groove end wall 76. This centering action is effective at all times regardless of whether the piston is being moved due to the mechanical action of the crank 28 or due to the hydraulic action of the pressure fluid.

Figure 7:
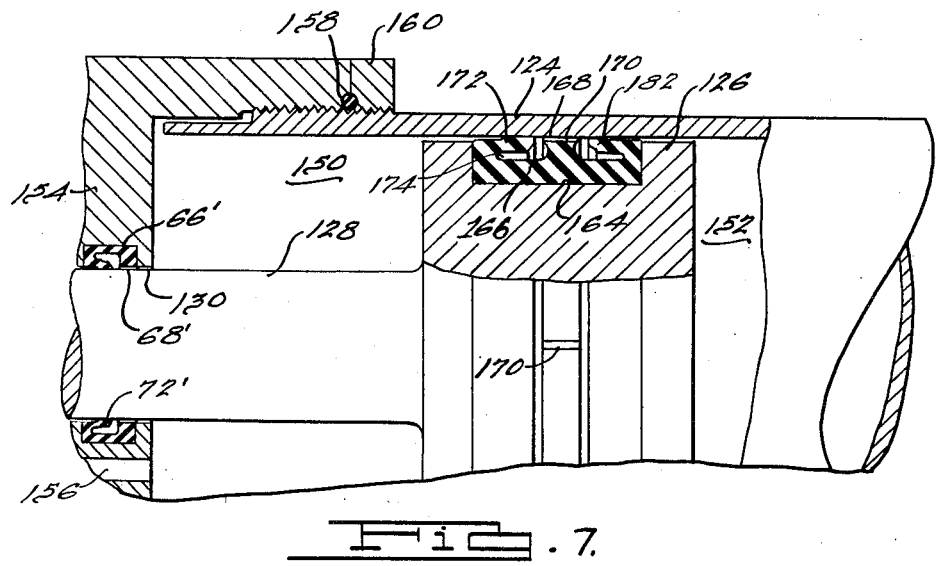
Figures 7 and 8 are respective sectional and fragmentary enlargement views of a modified form of the present sealing structure.
Figure 8:
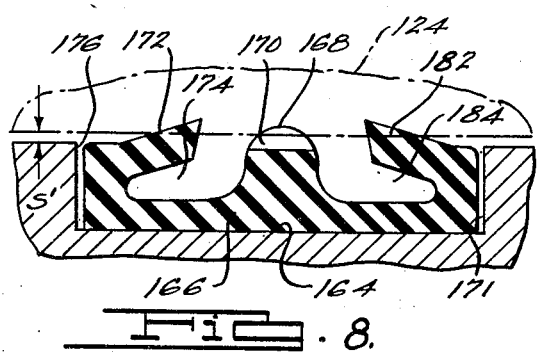

In a modified form of the invention according to Figures 7 and 8, a movable piston 126 is shown which is contained in a stationary cylinder 124 and which is at least partially guided by means of a piston rod 128 integrally connected to the piston 126. The piston rod 128 passes through an end opening 130 formed in the cylinder 124. The piston 126 and the cylinder 124 mutually define a pair of opposite working chambers 150, 152, the former of which is served by a passage 156 formed in a stationary component 154. The end opening 130 may be sealed by means of a seal 66' similar to the seal structure of the preceding embodiment of Figures 1–6 but differing therefrom in that the seal 66' is carried by the stationary component 154 forming a part of the cylinder 124, and seals a cylindrical member sliding relatively inwardly thereof rather than relatively outwardly thereto according to the embodiment of Figures 1–6. Moreover, the centering nose 68' of the seal body 66' acts as a wet bearing through which the thus guided piston rod 128 passes, and the lip 72' seals the rod 128 and the chamber 150. The power cylinder component 154 is internally threaded to receive a screw threaded main body for the cylinder 124, and the threads are sealed by a seal 158 held in place by a spanner nut lock ring 160. The piston 126 is of a semi-floating construction being at least partially centered at one end of its stroke by means of the bearing and seal 66' and being self-guiding at the opposite end of its stroke in which the piston rod 128 is in a relatively inwardly extended position. The piston 126 being of a double acting construction, has a centrally located wide, flat groove 164 therein which receives on the bottom thereof the flat, elongated solid body 166 of a lip-type seal. The seal body 166 is thickened at a mid portion between the opposite ends thereof to form a self-centering nose or bearing 168 of substantially semi-circular cross section. The nose 168 is annularly discontinuous by reason of being formed with one or more transversely extending interruptions or notches 170 of a general semi-circular cross section. Such notches 170 provide for the free communication of fluid pressure between opposite sides of the nose 168. When the seal body 166 is assembled in position between the two closely interfitting members 124, 126, the clearance at each of the opposite sides of the piston 126 indicated at S', may be 0.010", or in other words, 0.020" total diametrical clearance. The nose 168 is caused to deform during assembly due to the pressure of the cylinder wall 124 thereagainst, and this pre-stressed nose 168 is supported by a substantially coextensive portion of the seal body 166 therebelow which rests on the bottom of the groove 164. The pressure due to such pre-stress is greatest substantially midway between the axial ends of the area of contact of the nose 168 with the inner surface of the cylinder wall 124. The seal body 166 is thickened at each of its opposite ends and reversely bent on itself so as to be radially offset and provide a pair of opposite reentrant angled spaces 174, 184 and also form a pair of opposite lips 172, 182, one at each end of the seal. The seal body 166 has a side surface at one end engageable with an end wall 176 of the groove 164 radially within the radially short space S' and has a side surface at the opposite end engageable with an end wall 171 of the groove 164 radially within the radially short space S'. The seal body 166 is shown in a relaxed state in Figure 8, but when assembled and subjected to fluid pressure, for instance fluid pressure coming from the working chamber 152, a portion of the lip 182 is caused momentarily to separate from the cylinder wall 124 with which it is engaged so as to permit fluid pressure to be communicated, as in Figure 7, past the notches 170 and into the reentrant angled space 174 so as to press the seal lip 172 tightly against the wall of the cylinder 124 and increase the area of sealing contact thereof. Thereupon the seal body will be caused to press against the groove end wall 176 and transmit the force of the fluid pressure effective in the space 174 directly to the piston 126. Movement of the piston 126 will be to the left, as viewed in Figure 7, causing pressure fluid to be expelled from the working chamber 150 and out of the drain opening 156 formed in the cylinder component 154. Conversely, when pressure fluid is introduced into the working chamber 150 and the working chamber 152 is connected to drain, not shown, a portion of the lip 172 withdraws momentarily from contact with the cylinder wall 124 so as to permit pressure fluid to enter the reentrant angled space 184 whereupon the sealing area of contact of the lip 182 is increased from the predetermined amount shown in Figure 7 and the lip 172 at the opposite end of the seal body 166 re-engages the cylinder wall 124 over a predetermined area of contact smaller than shown in Figure 7. The seal body 166 is thereupon caused to engage the groove end wall 171 and the seal and the piston 126 move to the right, as viewed in Figure 7. It will be noted in the embodiment of Figures 7 and 8 that regardless of the presence or absence of fluid pressure, the seal body 166 is self-centering due to the presence of the bearing nose 168 and that regardless of which direction in which the seal moves due to the presence of fluid pressure, the unbalanced force existing in the reentrant angled spaces 174, 184, one or the other is communicated by the seal directly to the appropriate groove end wall 176 or 171 without being transmitted through any intervening or long portions of the deformable seal.

As herein disclosed, the seal structure is shown incorporated in a sealed piston and cylinder environment in which the piston is of the full-floating or partial floating construction within the cylinder. It is evident, however, that the seal structure will be equally effective to seal a fully guided piston retained within the cylinder. So also the drawing shows a seal having a centering nose or bearing of semi-circular cross section, but self-evidently the centering nose can be formed of another curvilinear section, for instance, formed of an elliptical or an ovally-shaped section. The seal structure having the flat body 66, according to the embodiment of Figure 2, and the flat body 166, according to the embodiment of Figure 7, is shown located in a flat groove formed on an inner reciprocally movable member, whereas the seal structure 66', according to the just-named embodiment of Figure 7, is located in a flat groove formed on an outer stationary member, but indeed, it is not essential to the invention that the seal be so located, and such seal can be used to advantage when disposed in the groove of an outer movable part or in the groove of an inner stationary part, and for that matter without regard to whether or not either or both of a pair of cooperating sealed parts rotate relative to one another or relatively reciprocate, or both.

Variations within the spirit and scope of the invention described are equally comprehended by the foregoing description.

What is claimed is:

1. Fluid sealing structure for the radially short space between opposed surfaces of first and second cylindrical members one within the other having telescoping diameters, the first of said members having a shallow annular groove and the second member having a cylindrical surface opposed to said groove, said sealing structure being receivable in said groove and comprising an endless, solid, rubber-like ring having a body portion of elongated cross sectional shape in contact with the bottom wall of said groove and having a thickened portion forming a peripherally extending centering nose of rounded cross-section, said nose being provided with a transverse notch therethrough, said ring being operatively assembled with the centering nose thereof in contact with the cylindrical surface of the second member, said nose being deformed by pressure exerted radially on the ring by said cylindrical surface, said pressure being greatest substantially midway between the axial ends of the area of contact of the centering nose with the cylindrical surface, said transverse notch providing for the free communication of fluid pressure between opposite sides of the centering nose, said ring further having a thickened end portion reversely bent on itself to provide an offset with an unsupported peripheral lip having a surface engageable with said cylindrical surface, said lip being deformed by pressure exerted thereon by said cylindrical member to define a predetermined area of sealing contact therewith in absence of substantial fluid pressure being communicated thereto past said centering nose, said seal being deformed additionally by such latter named pressure to increase the pressure of said lip surface against said cylindrical surface and to increase the area of sealing contact from that of said predetermined area.

2. A fluid seal for the radially short space between opposed surfaces of first and second mutually telescoped members, said first member having a substantially cylindrical surface and said second member having an end wall, said seal comprising an annular solid rubber-like ring having a body portion of generally flat elongated shape and having a thickened portion forming a peripherally extending centering nose having a plurality of transverse grooves therethrough, said ring body being operatively assembled with the nose thereof in contact with the cylindrical surface of the first member, said nose being deformed so as to present a sliding area of contact, said ring further including a thickened portion at one end reversely bent on itself to provide an offset with an unsupported peripheral lip having a surface engageable with the cylindrical surface on said first member, said lip being deformed by pressure exerted thereon by said cylindrical surface to define a predetermined area of sealing contact therewith in absence of substantial fluid pressure, said seal lip being deformed additionally by such latter named pressure to increase the pressure of said lip surface against the cylindrical surface on said first member and to increase the area of sealing contact from that of said predetermined area, said ring having a side surface at said one end engageable with said end wall and transmitting directly thereto the axial thrust from said reversely bent thickened portion due to the exertion of fluid pressure thereon.

3. A fluid seal for the radially short space between opposed surfaces of first and second mutually telescoped members, said first member having a substantially cylindrical surface and said second member having a groove defined in part by a pair of mutually opposed end walls adjacent the cylindrical surface and spaced apart from one another in an axial direction with respect to said cylindrical surface, said seal being disposed between said mutually opposed end walls and comprising an annular deformable ring having a body portion of generally flat elongated cross sectional shape and having a thickened portion forming a discontinuous peripherally extending centering nose, said ring being operatively assembled with the centering nose thereof in contact with the cylindrical surface of said first member in deformed condition so as to present a sliding area of contact and with the body portion in contact with the bottom of said groove, said ring further having a thickened portion at one end reversely bent on itself to provide an offset, said ring being further provided with an unsupported peripheral lip having an outside surface engageable with the cylindrical surface on said first member in deformed condition resulting from pressure exerted thereon by the cylindrical surface and defining a predetermined area of sealing contact therewith in absence of substantial fluid pressure being communicated thereto past said centering nose, said seal being deformed additionally by such latter named pressure to increase the pressure of said lip outside surface against the cylindrical surface on said first member and to increase the area of sealing contact from that of said predetermined area, said seal having an end surface at the side of said one end engageable with the end wall at that side and transmitting directly thereto the axial thrust from the reversely bent thickened portion at that side due to the exertion of fluid pressure thereon communicated from the opposite side thereof.

4. A fluid seal for the radially short space between opposed surfaces of first and second mutually telescoped members, said first member having a substantially cylindrical surface and said second member having a groove defined in part by a pair of mutually opposed end walls adjacent the cylindrical surface and spaced apart from one another in an axial direction with respect to said cylindrical surface, said seal being disposed between said mutually opposed end walls and comprising an annular deformable ring having a body portion of generally flat elongated cross sectional shape and having a thickened portion at one end to provide a discontinuous peripherally extending centering nose, said ring being operatively assembled with the centering nose thereof in contact with the cylindrical surface of said first member in deformed condition so as to present a sliding area of contact and with the body portion in contact with the bottom of said groove, said ring body further having a thickened portion at the other end reversely bent on itself to provide an offset, said ring being further provided with an unsupported peripheral lip having an outside surface engageable with the cylindrical surface on said first member in deformed condition resulting from pressure exerted thereon by the cylindrical surface and defining a predetermined area of sealing contact therewith in absence of substantial fluid pressure being communicated thereto past said centering nose, said seal being deformed additionally by such latter named pressure to increase the pressure of said lip outside surface against the cylindrical surface on said first member and to increase the area of sealing contact from that of said predetermined area, said ring having an end surface at the side of the other end aforesaid engageable with the end wall at that side and transmitting directly thereto the axial thrust from the reversely bent thickened portion at that side due to the exertion of fluid pressure thereon communicated from the opposite side of the ring and past said centering nose.

5. A fluid seal for the radially short space between opposed surfaces of first and second mutually telescoped members, said first member having a substantially cylindrical surface and said second member having a pair of mutually opposed end walls adjacent the cylindrical surface and spaced apart from one another in an axial direction with respect to said cylindrical surface, said seal being disposed between said mutually opposed end walls and comprising an annular deformable ring having a body portion of generally flat elongated cross sectional shape and having a thickened mid portion between the ends thereof forming a discontinuous peripherally extending centering nose, said ring being operatively assembled with the centering nose thereof in contact with the cylindrical surface of said first member in deformed condition so as to present a sliding area of contact, said ring further having a thickened portion at each said end thereof reversely bent on itself to provide an offset and being provided with an unsupported peripheral lip having an outside surface engageable with the cylindrical surface on said first member in deformed condition resulting from pressure exerted thereon by the cylindrical surface, and defining a predetermined area of sealing contact therewith in absence of substantial fluid pressure being communicated thereto past said centering nose, said seal being deformed additionally by such latter named pressure to increase the pressure of said lip outside surface against the cylindrical surface on said first member and to increase the area of sealing contact from that of said predetermined area, said ring having an end surface at the side of each said end thereof engageable with the respective end wall at that side and transmitting directly thereto the axial thrust from the reversely bent thickened portion at that side due to the exertion of fluid pressure thereon communicated from the opposite side of the ring and past said centering nose.

6. A fluid seal for the radially short space between opposed surfaces of a pair of members one telescoped within another, said one member having a substantially cylindrical surface and said other member having an end wall, said seal comprising a one-piece annular rubber-like ring having a body portion of generally flat elongated cross sectional shape and having a thickened portion providing a radially inwardly extending bearing formed with a semicircular cross section and provided with a plurality of transverse grooves therethrough and being operatively assembled in contact with the cylindrical surface of said one member in deformed condition so as to present a slide-bearing area of contact, said transverse grooves providing for the free communication of fluid pressure between opposite sides of the bearing, said ring further having a thickened portion at one end reversely bent on itself to provide a radially inwardly extending offset and being provided with an unsupported inner circumferential lip surface engageable with the cylindrical surface on said one member in deformed condition resulting from pressure exerted thereon by said cylindrical surface, and defining a predetermined area of sealing contact therewith in absence of substantial fluid pressure being communicated thereto past said bearing, said seal being deformed additionally by such latter named pressure to increase the pressure of said lip surface against the cylindrical surface on said one member and to increase the area of sealing contact from that of said predetermined area, said ring having a side surface at said one end engageable with said end wall radially within said radially short space and transmitting directly thereto the axial thrust from said reversely bent thickened portion due to the exertion of fluid pressure thereon communicated from the opposite end of the ring.

7. A fluid seal for the radially short space between opposed surfaces of first and second mutually telescoped members, said first member having a substantially cylindrical surface, said seal comprising a body seated against said second member and having a discontinuous peripherally extending centering nose of deformable material in supporting contact with the cylindrical surface of said first member, said seal also having a peripherally extending portion projecting from said body and terminating in a peripheral lip of deformable material directed toward said nose and offset from said body, said lip being deformable into sealing contact with said cylindrical surface by fluid pressure in the space between said body and offset lip, said seal being also axially engageable with a portion of said second member to transmit the axial thrust thereto due to fluid pressure on said seal.

References Cited in the file of this patent
UNITED STATES PATENTS

| 1,837,675 | Rick | Dec. 22, 1931 |
| 2,259,453 | Beyer et al. | Oct. 21, 1941 |
| 2,328,578 | Payne | Sept. 7, 1943 |
| 2,340,466 | Gosling | Feb. 1, 1944 |
| 2,417,828 | Joy | Mar. 25, 1947 |
| 2,626,839 | Creson et al. | Jan. 27, 1953 |

FOREIGN PATENTS

| 527,363 | Great Britain | Oct. 8, 1940 |